Figure 5:
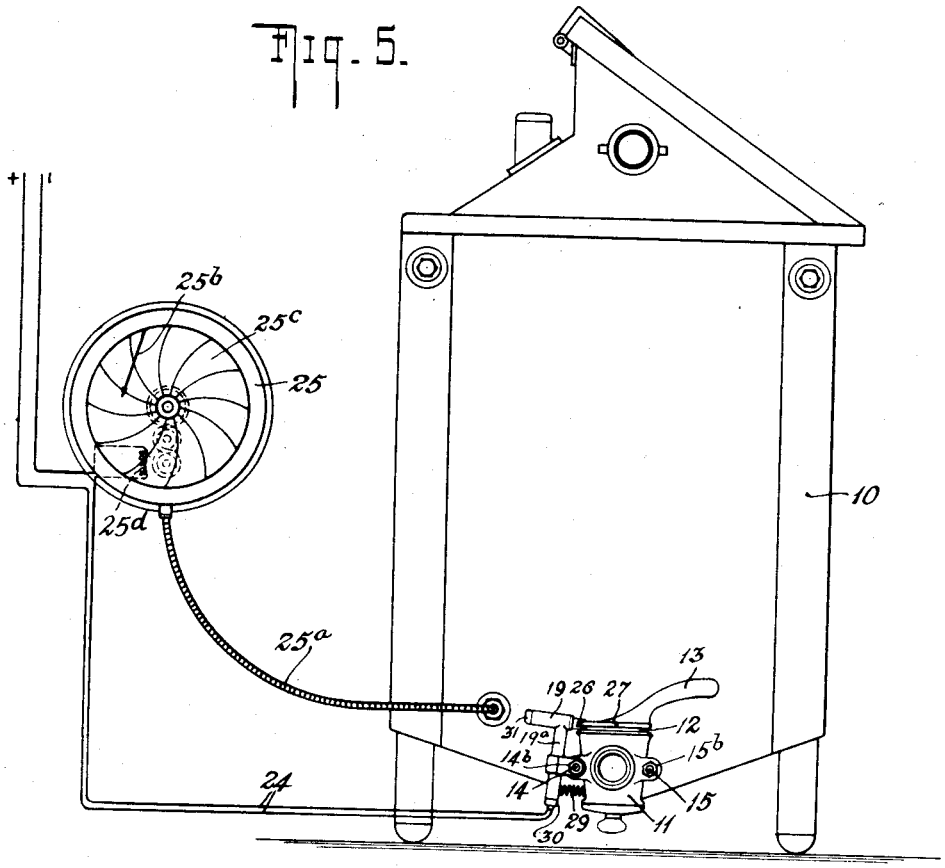

Nov. 16, 1937.  F. J. BAST  2,099,417
HEAT PROCESSING RECORDER
Filed Jan. 2, 1932  3 Sheets-Sheet 1
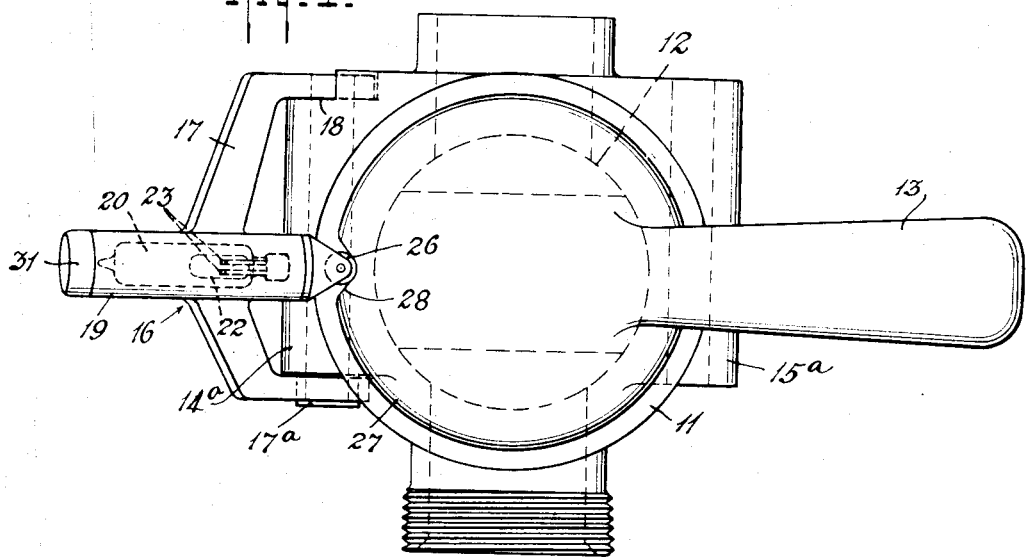
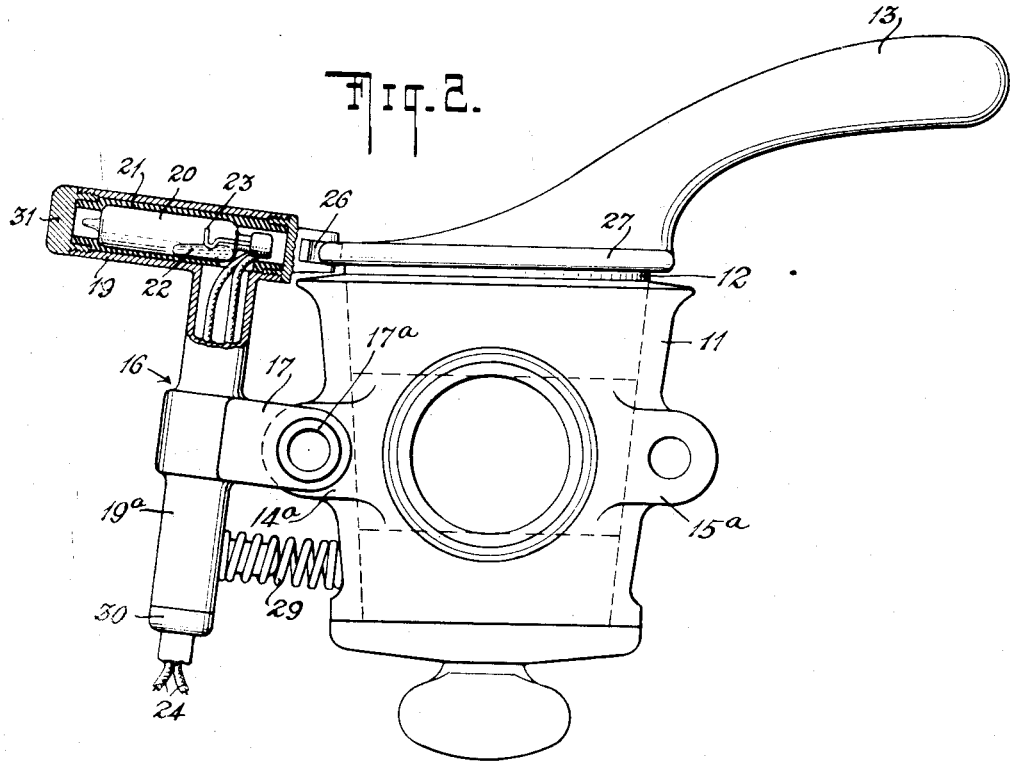
WITNESS
INVENTOR
FRANK J. BAST
BY
ATTORNEYS

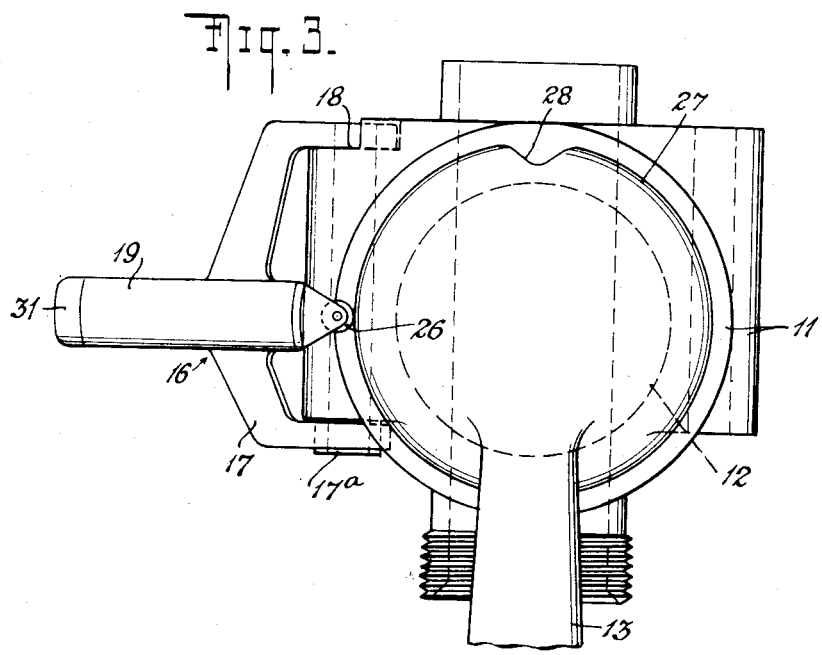
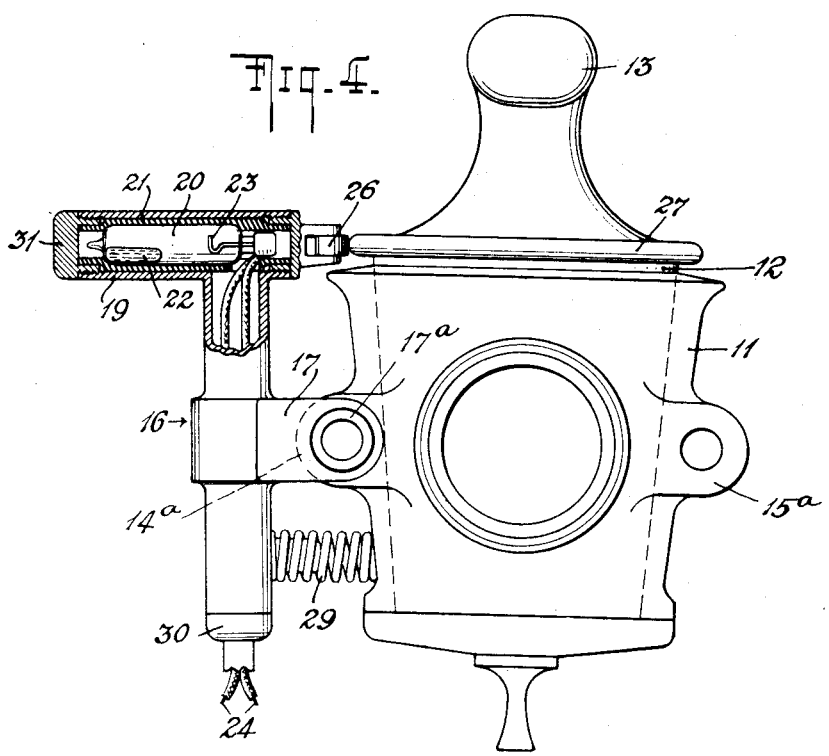

Nov. 16, 1937.  F. J. BAST  2,099,417
HEAT PROCESSING RECORDER
Filed Jan. 2, 1932  3 Sheets-Sheet 3

WITNESS

INVENTOR
FRANK J. BAST
ATTORNEYS

Patented Nov. 16, 1937

2,099,417

UNITED STATES PATENT OFFICE 2,099,417

HEAT-PROCESSING RECORDER

Frank J. Bast, Queens Village, N. Y., assignor to Charles J. Tagliabue Mfg. Co., Brooklyn, N. Y., a corporation of New York Application January 2, 1932, Serial No. 584,352

3 Claims. (Cl. 234—6)

The present invention relates to heat processing apparatus provided with a recorder mechanism adapted to record the course and duration of a physical condition in such apparatus by being sensitively responsive to a temperature in the apparatus and has for its object to provide a mechanism operative upon a variation of factors material to the condition to be recorded but other than the temperature to which the recorder mechanism is sensitively responsive, to compel the recorder mechanism to record the time of the occurrence of such variations of such other factors. My invention is of particular utility in connection with operations or treatments requiring the continuance of a temperature for a definite or minimum length of time and one effect of the mechanism which forms the subject matter of the present invention is to indicate clearly upon inspection of the chart of the recorder whether the duration of a certain operation or heat-processing treatment has been of the proper length.

The invention will be described in connection with an apparatus for the pasteurization of milk, but it will be understood that the invention can be applied to many similar situations. It is well known that in the pasteurization of milk it is essential that the milk be kept at a pasteurizing temperature which is usually about 144° F. for at least half an hour. Records of the duration and temperature of the pasteurizing treatment are made on a recorder chart which notes the data transmitted to the recorder instrument from a temperature-sensitive bulb immersed in the milk under treatment and usually near the bottom of the vat or tank. The charts are carefully studied by Government inspectors and if any chart should show that the pasteurizing temperature was not maintained for at least one-half of an hour the milk from that vat will not be pasteurized and is forbidden to be disposed of as pasteurized milk. If, however, the vat begins to be drained before the half hour has elapsed, the milk which leaves the vat is not properly pasteurized, but the chart will still continue to record the presence of the pasteurizing condition because the sensitive bulb remains in the body of 144° milk until the upper level of the milk in the vat begins to coincide with the position of the bulb. Accordingly the chart will show a continuance of the pasteurizing condition though in fact the major portion of the milk has not been pasteurized. In order to control such a situation and to make sure that milk which has actually not been pasteurized should not receive the sanction of the Government inspectors as pasteurized milk, to guard against negligence of employees in prematurely starting to drain the pasteurizing vats and to remove all possible temptation on the part of operators to start draining prematurely in the belief that the chart will not show it, I provide supplemental mechanism controlled by the open and closed positions of the draining valve which will cause a record to be made on the chart of the recorder of the exact instant at which the discharge valve is brought from its closed position to its open position.

In the accompanying drawings Fig. 1 is a top plan view of the valve and associated mechanism, the valve being in the closed position; Fig. 2 shows the valve in elevation, likewise in closed position, the switch mechanism being shown partly in section and being adapted to control the electric clock circuit of a recorder mechanism. Figs 3 and 4 are respectively a top plan and a front elevation of the valve in the open position, and Fig. 5 is an illustrative view showing the pasteurizing tank with a recorder instrument associated therewith.

The pasteurizing tank 10 may be of any suitable construction having an outlet valve 11 of any known or standard type, such valve being illustrated as provided with a transversely apertured movable member or plug 12, the position of the plug being controlled by the handle 13. The valve is supported upon the tank and prevented from being rotated with relation thereto by means of studs 14 and 15 which pass through perforated lugs 14a and 15a and through the bearing collar 17a of the front forked end 17 of the frame 16, said lugs extending from the body of the valve, the nuts 14b and 15b being thereupon tightened on the studs 14 and 15 against the ends of the collar 17a and lug 15a.

The conventional temperature-sensitive bulb (not shown) occupies a position within the vat 10 at the lower part thereof and is in communication via the flexible hose 25a with the recorder 25 which may be of any standard construction whereby the temperature of the sensitive bulb is recorded by the pen 25b on the chart 25c (Fig. 5).

As shown in Figs. 1 to 4, the frame 16 is provided with the forked or U-shaped portion 17 whose arms are pivotally mounted upon the stud 14, the body of the valve being cut away as shown in 18, Figs. 1 and 3, to provide room for the arm adjacent to the wall of the tank. The frame 16 includes tubular portions 19 and 19a extending at right angles to each other. Within the tubular portion 19 a mercury contactor capsule 20 is positioned, being preferably packed with a sleeve 21 of rubber or other suitable cushioning material. A body of mercury 22 is situated within the capsule 20 and is adapted upon the tilting of the frame 16 toward the valve 11 (Fig. 2) to bridge two contact members 23 (Fig. 1). The contact members 23 are connected with cables 24 which form part of the electric circuit of the clock mechanism of a time-temperature recorder such as the recorder 25 shown in Fig. 5. The cables 24 pass through the tubular portion 19a, plug 30 threaded into the end of the tubular portion 19a providing a fluid-tight seal; a fluid-tight seal is similarly provided for the tubular portion 19 by the plug 31.

The frame 16 is provided with a roller 26 which is adapted to bear against a cam surface composed of the flange 27 which projects horizontally from the plug 12. The flange 27 is provided with a recessed portion 28 of such size and depth as to accommodate the roller 26 and to enable the frame 16 to be tilted toward the valve to a sufficient extent to cause the body of mercury 22 to move toward the valve and to bridge the contact members 23. A compression spring 29 operates to urge the roller 26 against the flange 27.

In the closed position of the valve the roller 26 is seated in the recess 28 (Figs. 1 and 2) and the circuit of the recorder clock mechanism, or motor, 25d is closed. As soon as the valve begins to be opened, the roller 26 is cammed out of recess 28 against the action of spring 29, so that the frame 16 is tilted away from the valve, causing the body of mercury 22 to move to the position shown in Fig. 4, breaking the electric connection between the contacts 23, opening the switch, and stopping the recorder clock whose record will accordingly indicate the exact instant at which the valve is opened.

It will be clear from the foregoing description that by the use of the novel arrangement fraudulent or inadvertent reduction in the time during which the milk is subjected to a pasteurizing temperature is immediately made evident to an inspector. The device is simple and requires practically no substantial reconstruction of standard parts. Furthermore it is so assembled as to be practically fool- and malice-proof, especially if the recorder chart is fastened to the clock spindle by means of one or more pins 26 which pierce the chart and thereby prevent the operator from turning it by hand or from concealing such a manipulation in case he attempts it.

It is evident that my novel mechanism may be utilized in other situations wherein it is desired to record a heat-processing condition such as the opening or closing of a valve or other member and that my invention is not limited to the specific embodiment thereof shown and described, but that various modifications may be resorted to within the scope of the appended claims without departing from the spirit of the invention.

I claim:

1. In an arrangement for recording automatically the temperature and time of discharge of a fluid from an apparatus for heat-processing the fluid, the combination with an instrument for recording the then temperature of the fluid; means sensitive to the temperature of the fluid and operatively connected with said instrument; said instrument including means for recording the temperature on a chart and an electric motor for driving the chart; an electric circuit for operating said motor; and a discharge valve associated with said apparatus: of a switch actuated by said valve and connected in said circuit for controlling the operation of said motor, said switch being arranged to open said circuit upon the opening of said valve.

2. In an arrangement for recording automatically the temperature and time of discharge of a fluid from an apparatus for heat-processing the fluid, the combination with an instrument for recording the then temperature of the fluid and operatively connected with said apparatus; a circuit; and an electric motor connected with said circuit: of a discharge valve associated with said apparatus; a sealed switch in said circuit adapted to be closed in one position and be opened in another; and means operatively connected with said valve and adapted and arranged to operate said sealed switch to whichever of said positions is effective to stop said motor whenever said valve is opened.

3. In an arrangement for recording automatically the temperature and time of discharge of a fluid from an apparatus for heat-processing the fluid, the combination with an instrument for recording the then temperature of the fluid and operatively connected with said apparatus; a circuit; and an electric motor connected with said circuit: of a discharge valve having a movable member for opening and closing the same, a tiltable frame mounted on the body of the valve and inclined in one direction in the closed condition of the valve, a sealed switch connected with said circuit in said frame, said switch being operable according to its angle of tilt, and a cam on said movable member acting to compel the frame to become inclined in the opposite direction as said member is moved to open position.

FRANK J. BAST.